Sept. 26, 1967   N. P. MANTERIS   3,343,527
OUTDOOR GRILL
Filed Oct. 21, 1965

INVENTOR
NICK PAUL MANTERIS

BY Cullen, Sloman & Cantor

ATTORNEYS

United States Patent Office 3,343,527
Patented Sept. 26, 1967

3,343,527
OUTDOOR GRILL
Nick P. Manteris, 10310 Saratoga,
Oak Park, Mich. 48237
Filed Oct. 21, 1965, Ser. No. 499,977
2 Claims. (Cl. 126—25)

ABSTRACT OF THE DISCLOSURE

An outdoor grill having a vertically disposed firebox laterally displaced from the food-supporting grill, with the top of the firebox disposed slightly above the plane of the grill, and the bottom of the firebox disposed considerably below such grill. The firebox is fully enclosed except for an open top face and an open side face facing the grill. The open side has a non-porous barrier strip at the height of the grill, to promote circular flow of heated gases.

---

This invention relates generally to cooking apparatus, and more particularly to cooking apparatus intended for outdoor recreational use.

Several shortcomings and disadvantages are inherent in conventional charcoal grills intended for recreational use. It is necessary to continuously rotate or periodically turn over the food being cooked to insure complete and even cooking. Fat drippings from the meat produce flare-ups of the burning charcoal, necessitating constant supervision to prevent fires and undesirable deposits of soot on the food. Furthermore, the juices of the meat are frequently lost into the fire.

Accordingly, it is an object of this invention to provide a new and improved outdoor grill which eliminates the need for periodically or continuously turning over the meat. It is a further object of this invention to provide an outdoor cooking device which eliminates the problems produced by fats and juices dripping from the meat into the fire.

Other objects and advantages of this invention will become apparent from the following specification, when considered in conjunction with the accompanying drawings.

Figure 1:
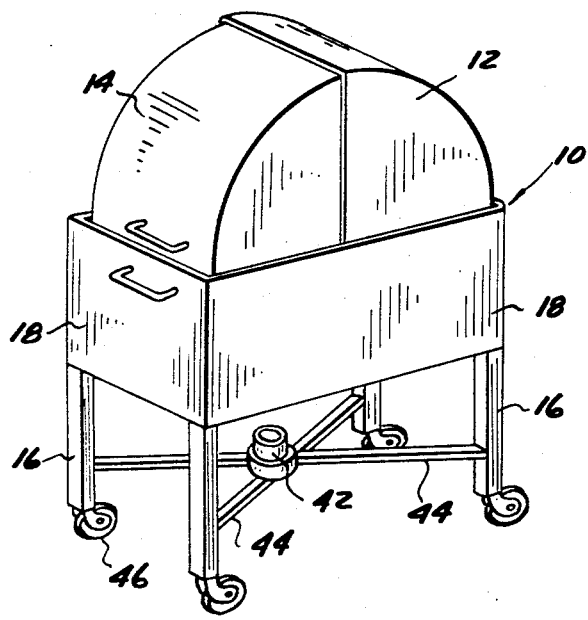
FIG. 1 is a perspective view of the outdoor grill of this invention.
Figure 2:
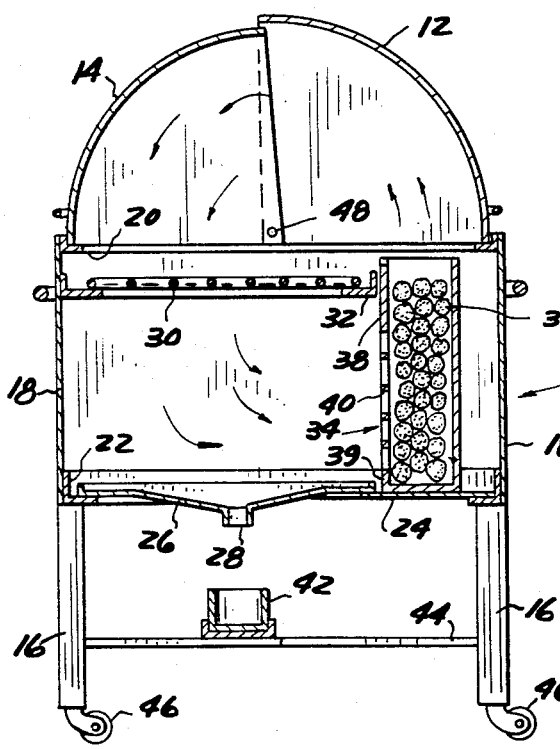
FIG. 2 is a side, cross-sectional view of the grill.

Referring to FIGS. 1 and 2 of the drawings, the outdoor grill generally comprises a body or heating chamber 10, the upper portion of which is enclosed by a cover 12 and hood 14, and four supporting legs 16.

The body comprises four side panels 18 which are assembled to an upper peripheral frame formed by cover ledge 20 and a lower peripheral frame formed by lower ledge 22. The bottom of the body is enclosed by a floor 24 which extends across a portion of the body, and a removable grease or drip pan 26 which is supported at its periphery on lower ledge 22 and floor 24. A grease outlet 28 is formed in the center of the concave drip pan 26, so that grease drippings which accumulate in the bottom of the body can drain out. Perforations may be provided (not illustrated) in floor 24, or a space under the edges of pan 26, to supplement outlet 28 in establishing openings for air to enter the heating chamber.

Figure 3:
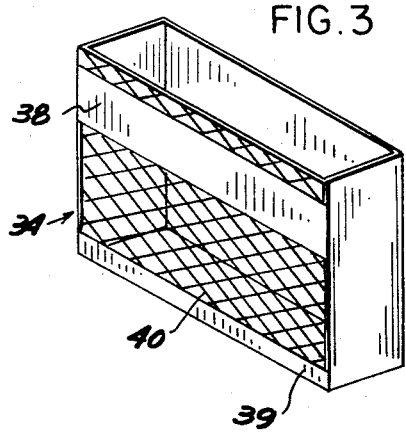
FIG. 3 is a perspective view of the firebox portion.

A conventional type of food supporting grill 30 rests on a grill ledge 32. Adjacent the right hand edge of grill 30 (as viewed in FIG. 2) is firebox 34, shown in FIGS. 2 and 3. The top of the firebox is open to permit filling of fuel and removal of ashes, and is otherwise fully enclosed except for the side which faces the edge of grill 30. Except for a barrier belt 38 (the purpose of which will be described below) and a narrow lower strip 39 for retaining ashes, the side face is covered with an expanded metal or other type of grill work 40.

A grease cup 42 to catch the drippings from pan 26 is positioned beneath outlet 28 and supported on crossbraces 44. Legs 16 are provided with casters 46 so that the grill can be readily moved about.

Hood 14 is pivotally mounted at 48 to cover 12, so that conditions under the cover can be checked without the necessity of lifting off the entire cover-hood assembly.

Side channels may be provided (not illustrated) inside box 10 for retaining firebox 34 in an upright position.

Operation

As is conventional, the fire is started in firebox 34 and allowed to establish itself before the meat is placed on grill 30.

The device may be used for charcoal cooking in the conventional manner by raising hood 14. Sufficient heat is transmitted by radiation and convection from firebox 34 to the food on grill 30 to cook the food notwithstanding that the fuel is located below and to one side of the food rather than directly below.

If it is desired to use the device as a broiler, hood 14 is lowered as soon as the fire is established. The temperature inside the heating chamber then rises markedly, temperatures as high as 600° F. having been observed.

By reason of the unique configuration and arrangement of the elements of this outdoor grill, a circular flow of heated air is established. Hot air heated by the charcoal passes up through firebox 34, around and along the underside of cover 12 and hood 14, down through grill 30, and returns to the lower portion of firebox 34 to be reheated (see arrows in FIG. 2).

This unique mode of operation has several advantages. It provides extremely high temperatures, which are uniformly applied to all sides of the meat by the circular flow which is established. It therefore is not necessary to rotate the meat on a spit, nor is it necessary to periodically turn it over. The food is uniformly and simultaneously cooked on all surfaces.

Because of the high temperatures produced, the food is seared on all surfaces immediately, so that the juices are retained in the meat and the flavor is thereby enhanced. Flare-ups and resulting soot deposits on the meat caused by dripping juices or fats are eliminated since the fuel does not lie below the meat. Since no cooking juices escape from the food, only grease or fat drains into cup 42, from which it can be readily removed.

The barrier belt 36 on the firebox performs an important role in insuring and establishing the circular flow of heated air. It has been found desirable to locate the upper edge of barrier belt 36 slightly higher than the top surface of grill 30, and the lower edge of barrier belt 36 several inches below the lower surface of the grill.

This invention may be further developed within the scope of the following claims. Accordingly, the above description is to be interpreted as illustrative of only a single operative embodiment of the invention, and is not to be read in a strictly limited sense.

I now claim:
1. An outdoor cooking unit, comprising:
    a body having an open top and defining a heating chamber therein;
    a horizontal food supporting grill spanning a portion of the upper part of said body and mounted thereon;
    a tall, thin firebox for holding burning fuel, said firebox being vertically disposed in said chamber along one edge of said grill and spaced outwardly therefrom;

said firebox being so dimensioned that its upper edge is at least as high as said grill;

said firebox being open at its top, closed at its bottom and at three of its four sides and being substantially open on its fourth side, with said fourth side facing toward said one edge of said grill;

said fourth side of said firebox being partially closed by a horizontal strip on non-porous material extending the length of said fourth side from a height just above the top of said grill, downward to a point intermediate the lower edge of said grill and the bottom of said firebox;

whereby the configuration and orientation of said grill and firebox induce a circular flow of heated air to simultaneously and uniformly cook all sides of food placed on said grill.

2. The outdoor cooking unit of claim 1, which further comprises a semi-cylindrical openable cover extending over and enclosing the upper portion of said heated chamber, whereby the configuration of the cover promotes the circular flow of heated air within said cooking unit.

References Cited

UNITED STATES PATENTS

| | | | |
|---|---|---|---|
| 2,666,425 | 1/1954 | Hastings | 126—25 |
| 3,025,784 | 3/1962 | Williams | 99—446 |
| 3,175,549 | 3/1965 | Bergsten | 126—25 |

FREDERICK KETTERER, *Primary Examiner.*